United States Patent
Camenisch et al.

(10) Patent No.: US 11,210,679 B2
(45) Date of Patent: Dec. 28, 2021

(54) AUTHENTICATION OF PACKAGED PRODUCTS

(71) Applicant: International Business Machines Corporation, Armonk, NY (US)

(72) Inventors: Jan L. Camenisch, Thalwil (CH); Emmanuel Delamarche, Thalwil (CH); Eduarda Freire-Stögbuchner, Rueschlikon (CH); Onur Goekce, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 15/859,358

(22) Filed: Dec. 30, 2017

(65) Prior Publication Data

US 2018/0240134 A1    Aug. 23, 2018

Related U.S. Application Data

(63) Continuation of application No. 15/440,816, filed on Feb. 23, 2017.

(51) Int. Cl.
*G06Q 20/00*    (2012.01)
*G06Q 30/00*    (2012.01)

(52) U.S. Cl.
CPC ..... *G06Q 30/0185* (2013.01); *G06Q 2220/00* (2013.01)

(58) Field of Classification Search
CPC .......... G06Q 2220/00; G06Q 2220/10; G06Q 2220/16; G06Q 30/0185
USPC .......................... 705/16, 21, 59; 380/44, 262
See application file for complete search history.

(56) References Cited

U.S. PATENT DOCUMENTS

| | | | |
|---|---|---|---|
| 8,534,544 B1* | 9/2013 | Eker | G06K 19/10 235/375 |
| 8,667,290 B2 | 3/2014 | Appelbaum | |
| 8,775,809 B2 | 7/2014 | Tuyls | |
| 8,934,682 B2 | 1/2015 | Baughman | |
| 2007/0282635 A1 | 12/2007 | Kereun | |
| 2007/0292969 A1* | 12/2007 | Canseco | G01N 33/558 436/510 |

(Continued)

OTHER PUBLICATIONS

J P Smith, Authentication of digital medical images with digital signature technology. RSNA, Radiology, Mar. 1995, vol. 194, Issue 3. Abstract only pp. 1-2.

(Continued)

*Primary Examiner* — Dante Ravetti
(74) *Attorney, Agent, or Firm* — Daniel Morris; Otterstedt, Wallace & Kammer, LLP

(57) ABSTRACT

Methods are provided for producing an authenticated packaged product. A digital signature, dependent on unique message data for the product, is generated via a digital signature scheme using a secret signing key. The message data is provided on at least one of the product and packaging. The digital signature is provided on the other of the product and packaging, and the product is packed in the packaging. The digital signature can be generated via a fuzzy-message digital signature scheme having a verification algorithm for verifying the digital signature in relation to fuzzy data within a predetermined difference measure of the message data. Methods and systems for authenticating such packaged products are also provided.

12 Claims, 5 Drawing Sheets

(56) References Cited

U.S. PATENT DOCUMENTS

| | | | |
|---|---|---|---|
| 2011/0302419 A1 | 12/2011 | Yoshioka et al. | |
| 2012/0069992 A1* | 3/2012 | Jozwiak | G06F 21/16 380/28 |
| 2012/0273564 A1 | 11/2012 | Mercolino et al. | |
| 2013/0028411 A1 | 1/2013 | Arkko et al. | |
| 2014/0122123 A1 | 5/2014 | Hofstetter | |
| 2014/0175165 A1* | 6/2014 | Havens | G16H 10/65 235/375 |

OTHER PUBLICATIONS

Hui-Mei Chao et al., A data-hiding technique with authentication, integration, and confidentiality for electronic patient records. IEEE Transactions on Information Technology in Biomedicine (vol. 6, Issue: 1, Mar. 2002), pp. 46-53. Abstract only p. 1.

Wei Pan et al., Medical image integrity control combining digital signature and lossless watermarking. Data Privacy Management and Autonomous Spontaneous Security, vol. 5939 of the series Lecture Notes in Computer Science pp. 153-162, Sep. 24-25, 2009, reprint pp. 1-11.

Dan Boneh & Xavier Boyen, Short Signatures Without Random Oracles and the SDH Assumption in Bilinear Groups, Journal of Cryptology, Apr. 2008, vol. 21, Issue 2, pp. 149-177 (Author's copy pp. 1-27).

Jan L. Camenisch, et al., unpublished U.S. Appl. No. 15/440,816, filed Feb. 23, 2017, Authentication of Packaged Products, pp. 1-35 plus 5 sheets of drawings.

Paul J. Otterstedt, List of IBM Patents or Patent Applications Treated as Related, Jun. 20, 2018, pp. 1-2.

Takahashi, "Signature Schemes with a Fuzzy Private Key," ACNS 2015, ACNS 2016, Jun. 2016. pp. 1-51.

* cited by examiner

200μm spot separation

AUTHENTICATION OF PACKAGED PRODUCTS

CROSS-REFERENCE TO RELATED APPLICATIONS

This application is a continuation of U.S. patent application Ser. No. 15/440,816 filed Feb. 23, 2017, the complete disclosure of which is expressly incorporated herein by reference in its entirety for all purposes.

BACKGROUND

The present invention relates generally to authentication of packaged products.

Currently, authentication of packaged products relies on printed information such as text, logos etc., on the packaging and/or product. It is easy to change or reproduce such information in order to misrepresent a product in some way, e.g. to present a fake or counterfeit product as genuine, and it is difficult for users to identify fraudulent products. As a particularly pertinent example, the health care industry has been a frequent target for fraud of this nature. Circulation of unauthorized or counterfeit medical products is widespread and has significant health implications. For example, medical test devices such as HIV (human immunodeficiency virus), malaria, hepatitis and pregnancy tests are commonly counterfeited. Techniques include imitating genuine product packaging for counterfeit products, altering critical product information, such as expiry dates, on packaging, and substituting products from one authentic packaging into another, such as the placement of pregnancy tests into packaging for HIV tests. The World Health Organization considers that counterfeiting of such tests compromises the detection and eradication of some diseases.

SUMMARY

According to at least one embodiment of the present invention there is provided a method for producing an authenticated packaged product. The method comprises: generating a digital signature, dependent on unique message data for the product, via a digital signature scheme using a secret signing key; providing the message data on at least one of the product and packaging; providing the digital signature on the other of the product and packaging; and packing the product in the packaging.

Methods embodying the invention uniquely bind a product to its packaging via the digital signature scheme. The digital signature can be authenticated for the message data using a verification algorithm of the signature scheme. Such verification algorithms use a verification key which corresponds to the secret signing key used to generate the signature. A forger cannot generate a valid signature without knowledge of the secret signing key, and cannot misrepresent fraudulent products, e.g. by replacing products in genuine packaging. Methods embodying the invention thus provide for secure authentication of packaged products.

In preferred embodiments, the digital signature is generated via a fuzzy-message digital signature scheme having a verification algorithm for verifying the digital signature in relation to fuzzy data within a predetermined difference measure of said message data. Cryptographic constructions for generation and verification of signatures in fuzzy-message signature schemes are presented below. Such a fuzzy-message digital signature scheme permits verification of a digital signature even if the message data suffers some corruption so that message data used on verification is different, up to a predefined limited extent, from that used to generate the signature. This is a highly advantageous feature in that it accommodates some limited degree of error, which may be necessary due to constraints inherent in implementations of the scheme, while still permitting detection of counterfeits. The message data may be incorrectly presented for various reasons, e.g. due to space constraints on the product/packaging and/or tolerances in mechanisms for representing messages resulting in errors on readback. In embodiments based on medical test devices, for example, space for messages may be very limited, and mechanisms for presenting the message data may have inherent inaccuracies as will be illustrated by examples below.

In general, the message data may be provided on only one of the product and packaging, in which case the signature is provided on the other, or the message data may comprise data on both of the product and packaging, in which case the signature may be provided on either. Where the product is a medical test device, the message data preferably comprises (at least) a first message which is provided on the test device, and the digital signature is most conveniently provided on the packaging. Where the medical test device is operable by application of a fluid to the device, the first message may be provided on the device in a form at least part of which is only revealed on application of the fluid to the device. The first message is thus hidden until the test is used, further inhibiting malicious intervention.

At least one further embodiment of the invention provides a method for authenticating a packaged product having unique message data for the product on at least one of the product and packaging and a digital signature, dependent on the message data, on the other of the product and packaging, the digital signature being generated via a digital signature scheme using a secret signing key. The method includes, at a verifier computer having a reader device operatively associated therewith, reading, via the reader device, the digital signature and the message data on the product and packaging. The method further comprises using a verification key corresponding to the secret signing key to verify the digital signature in relation to the read message data. In preferred embodiments where the digital signature is generated via a fuzzy-message digital signature scheme, the method includes verifying the digital signature in relation to read message data within a predetermined difference measure of the message data provided on the product and/or packaging.

In a first construction of a fuzzy-message digital signature scheme, the message data comprises a first message $m_1$ provided on the opposite one of the product and packaging to the digital signature, and the digital signature comprises the first message $m_1$ and signature data $\Sigma$ generated by signing signature-input data, comprising the first message $m_1$, using the secret signing key. With this construction, the packaged product can be authenticated by verifying the signature data $\Sigma$ in relation to the first message $m_1$ in the digital signature using the verification key, and determining if the read message data is within the predetermined difference measure of the first message $m_1$ in the digital signature. Only if the signature data $\Sigma$ is so verified, and the read message data is within the predetermined difference measure, will the digital signature be deemed valid (and validity may be subject to additional criteria discussed below).

In a second, preferred construction of a fuzzy-message digital signature scheme, the message data comprises a first message $m_1$ provided on the opposite one of the product and packaging to the digital signature, and the digital signature includes signature data Σ generated by encoding the first message $m_1$ to produce an encoded message $e(m_1)$ which comprises the first message $m_1$ and parity data p, and signing signature-input data, comprising the first message $m_1$, using the secret signing key. The digital signature then also includes the parity data p. With this construction, the packaged product can be authenticated by decoding the read message data using the parity data p to obtain a decoded message, and verifying the signature data Σ in relation to the decoded message using the verification key. Only if the signature data Σ is so verified will the digital signature be deemed valid. (Again, additional validity criteria may be applied here). With this construction, the first message $m_1$ is not revealed by the digital signature, while still permitting verification via the fuzzy-message signature scheme.

Both constructions described above can be adapted to accommodate message data which includes a second message $m_2$ on the same one of the product and packaging as the signature. In these embodiments, the first message $m_1$ may provide the fuzzy data in which some error is permitted in the verification process of the signature scheme, and the second message $m_2$ may be a "rigid" message, for which no error (fuzziness) is permitted on verification. This offers further advantages discussed below.

Preferred authentication methods may include, at the verifier computer, sending the read message data and digital signature via a network to a signature-management server for checking, at the server, whether that digital signature has been previously sent to the server, and in response to receipt from the server of a notification that the digital signature had been previously sent to the server, determining that the digital signature is invalid in relation to the read message data. This offers additional protection against any possible reproduction of the message data and signature from a genuine packaged product on a counterfeit. At least one further embodiment of the invention provides a system comprising a verifier computer as described above and a signature management server operable for communication via a network. The signature management server is adapted, in response to receipt of the read message data and digital signature from the verifier computer, to check whether that digital signature has been previously received and stored in storage operatively associated with the server, if so to send the verifier computer a first notification indicating that the signature is invalid and, if not, to use the verification key to verify the digital signature in relation to the read message data and, on verification of the digital signature, to send the verifier computer a second notification indicating that the signature is valid and to store the signature in said storage. The verifier computer is further adapted to determine that the digital signature is invalid in response to receipt of the first notification, and to determine that the digital signature is valid in response to receipt of the second notification. The signature verification step at the server offers additional protection against the possibility of abusive reporting of signatures from genuine packaged products in an attempt to undermine the system.

Further embodiments of the invention provide packaged products produced by a method described above, and computer program products for causing a verifier computer to perform an authentication method described above.

Embodiments of the invention will be described in more detail below, by way of illustrative and non-limiting example, with reference to the accompanying drawings.

DETAILED DESCRIPTION

Figure 1:
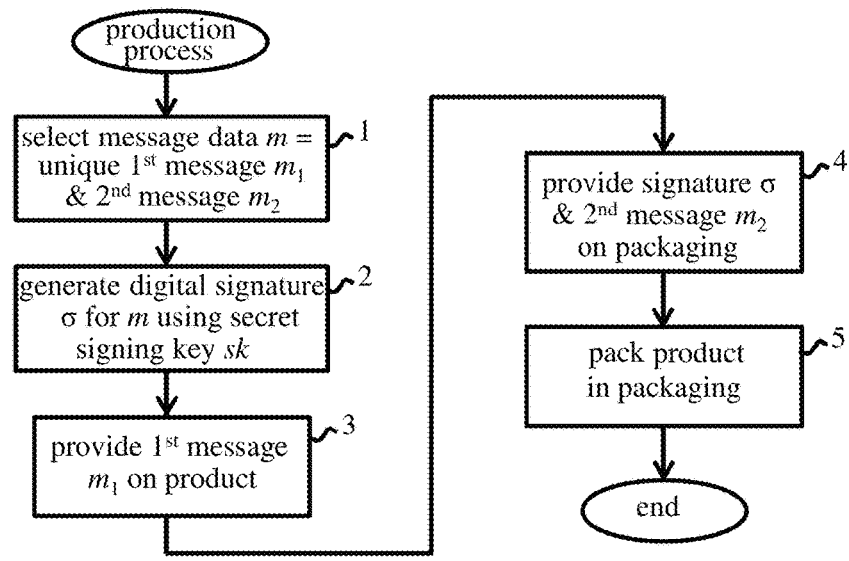
FIG. 1 indicates step of an authenticated packaged-product production method embodying the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 indicates basic steps of a process for producing an authenticated packaged product embodying the invention. Steps of this process may be performed by a product manufacturer during manufacture of the product/packaging and/or as part of the packing process. Particular steps may be performed by a (general- or special-purpose) computer of the manufacturer as part of an automated production process. In step 1, the manufacturer computer selects unique message data m for a current product. In the preferred embodiments to be described, the message data m comprises a first message $m_1$ and a second message $m_2$. The first message $m_1$ comprises data which is unique to the product, e.g. a product serial number or other identifier unique to the product. The second message $m_2$ may comprise more general data, such as data indicating product type, manufacturer details, expiration date, etc. as appropriate for the product, and may not be unique to a particular product. In step 2, the manufacturer computer generates a digital signature, denoted by σ, dependent on the message data m. The signature σ is generated via a digital signature scheme, described below, using a secret signing key sk of the manufacturer. The key sk is the secret key of a cryptographic signing/verification key-pair (pk,sk) where the verification key pk is a public key which can be certified by a trusted CA (Certification Authority) in accordance with a standard PKI (Public Key Infrastructure). In step 3 of the process, the first message $m_1$ is provided on the product. The message $m_1$ may be applied to the product in various ways, and at various stages of the overall manufacturing process, depending on the nature of the product and the particular mechanism for representing the message $m_1$ on the product. For example, the message $m_1$ may be provided on the product during production of the product itself, or may be applied to the product after production. In step 4, the digital signature σ and the second message $m_2$ are provided on the packaging for the product. Again, the signature σ and message $m_2$ may be applied to the packaging during or after production as appropriate. In step 5, the product is packed in the packaging, and the process is complete.

The basic steps described above may be performed in any convenient order depending on the particular nature of the product, packaging and packing process and the way in which data is represented on the product/packaging. The data can be represented in various ways, and the manner of representation may differ for the two messages $m_1$ and $m_2$, and for the digital signature σ. For example, data can be presented by one or a combination of text, numerals, symbols, ink-printed dots (which may be multi-colored), optical devices such as holograms, RFID (radio frequency identification) tags, code patterns such as barcodes, QR (Quick Response) codes, or any other code formation or data representation mechanism. Particular examples will be described further below. Moreover, the data representation mechanism may be such that message data is wholly or partially hidden on the product and/or packaging, and only revealed by later action, e.g. action taken when the product is used. This will be illustrated by examples below.

While the message data m comprises data $m_1$ and $m_2$ on the product and packaging respectively above, in other embodiments message data m may be provided on only one of the product and packaging. In such embodiments, the digital signature σ is provided on the other of the product and packaging. Where message data $m_1$, $m_2$ is provided on both of the product and packaging, the digital signature σ may be provided on the product in alternative embodiments.

The above process provides a packaged product in which the product is uniquely and authentically bound to its packaging via the digital signature scheme. The digital signature σ can be authenticated for the message data m, using the (public) verification key pk, via a verification algorithm of the signature scheme. This assures that the signature σ is valid for the message data m via the security properties of the signature scheme. A user can thus be assured that neither the signature nor message data have been tampered with, and that the packaging is genuine for the product. Signatures cannot be forged by a counterfeiter since only the product manufacturer, who knows the secret signing key sk, can generate valid signatures, and products cannot be fraudulently repackaged in genuine packaging of other products.

Figure 2:
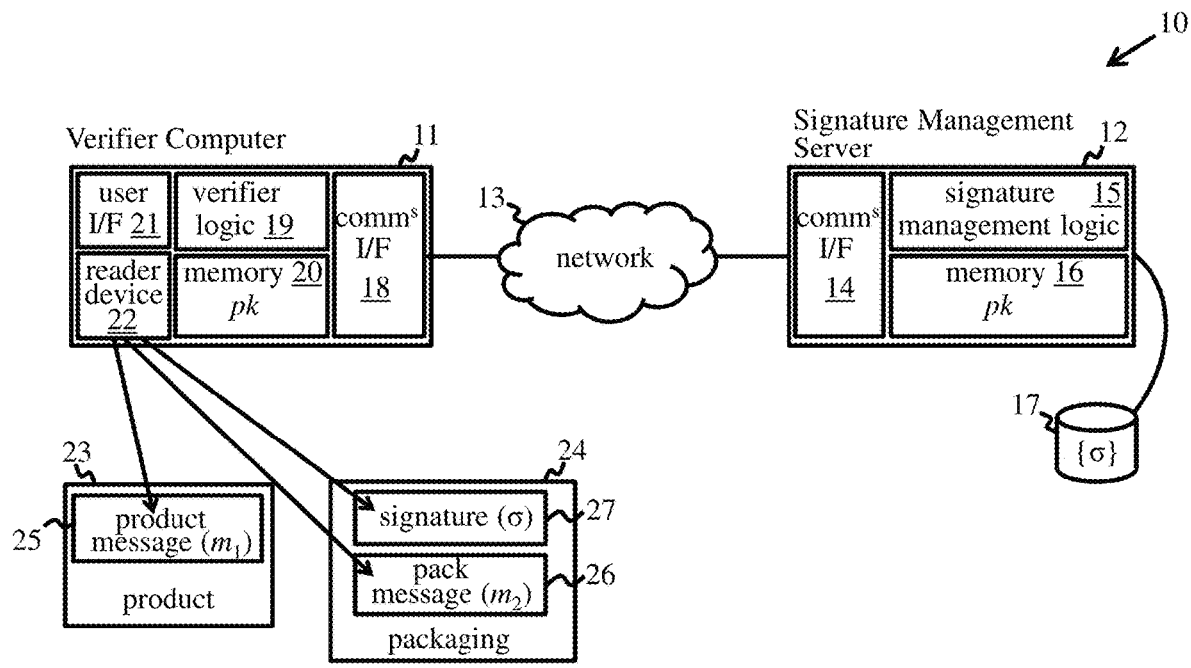
FIG. 2 is a schematic representation of an authentication system embodying the invention.

FIG. 2 is schematic block diagram of an authentication system for authenticating packaged products in preferred embodiments. The system 10 comprises a verifier computer 11 and a signature management server 12 which are operable for communication via a network 13. (Signature management server 12 may communicate with multiple verifier computers in operation, but the authentication procedure can be understood from the following description in relation to verifier computer 11). A high-level abstraction of functional components of verifier computer 11 and server 12 is shown in the figure. Server 12 is indicated here as comprising a communications interface (UF) 14 for communicating with verifier computer 11 over network 13, signature management logic 15 providing functionality for implementing steps of the authentication procedure described below, and memory 16 for storing data used by logic 15 in operation. This data includes the verification key pk corresponding to the signing key sk described above, as well as any other data required for operation of the protocols to be described. In operation of the authentication scheme, server 12 also stores a signature set (denoted by {σ}) in storage, represented here by database 17, operatively associated the server.

Verifier computer 11 comprises a communications interface 18 for communications with server 12 via network 13, verifier logic 19 providing functionality for implementing steps of the authentication procedure to be described, and memory 20 for storing data used by verifier logic 19 in operation. Again, this data includes the verification key pk and any other data required for operation of the protocols detailed below. Verifier computer 11 has a user OF 21 comprising a display for interaction with a user. The verifier computer also has reader device 22 operatively associated therewith. Reader device 22 is adapted for reading data from a product 23 and packaging 24 of a packaged product produced by the method of FIG. 1. In particular, reader device 22 is operable for reading a product message 25 (comprising $m_1$) from the product 23, and also a pack message 26 (comprising $m_2$) and a signature message 27 (comprising the digital signature σ) from the packaging 24.

Verifier computer 11 may be implemented by a general or special-purpose computer which is operated by a party wishing to authenticate the product 23. For example, verifier computer may be implemented by a general-purpose user computer such as a desktop computer, laptop computer, tablet, notebook, palmtop, mobile phone, PDA (personal digital assistant), or other user computer device. Alternatively, verifier computer 11 may be implemented by a dedicated hand-held unit in some scenarios. Reader device 22 may be integrated with verifier computer 11 (e.g. an integrated camera of a mobile phone or tablet computer) or may be coupled to verifier computer 11 (via a wired or wireless link) in any convenient manner. Various implementations of reader device 22 can be envisaged according to the particular manner in which the data $m_1$, $m_2$, σ is represented in messages 25, 26, 27 on the packaged product. For example, reader device 22 may comprise one (or a combination of) a camera, scanner, magnetic strip reader, RFID tag reader, or other sensor adapted to capture an image, scan, sense or otherwise "read" the messages 25, 26 and 27 so that data presented thereby is provided to verifier computer 11. The reader device 22 and/or verifier logic 19 may include functionality for interpreting messages 25 to 27, e.g. images thereof captured by a camera, to extract the data according to the particular manner of representation.

Network 13 may in general comprise one or more component networks and/or internetworks, including the Internet. Signature management server 12 may be implemented by a general- or special-purpose computer, comprising one or more (real or virtual) machines, providing functionality for implementing the operations described. In general, each of the functional blocks of devices shown in FIG. 2 may be implemented by one or more functional components which may be provided by one or more computers. The logic 15 and 19 of these devices may be implemented by hardware or software or a combination thereof. The logic may be described in the general context of computer system-executable instructions, such as program modules, executed by a computing apparatus. Generally, program modules may include routines, programs, objects, components, logic, data structures, and so on that perform particular tasks or implement particular abstract data types. The computing apparatus may be practiced in distributed cloud computing environments where tasks are performed by remote processing devices that are linked through a communications network. In a distributed cloud computing environment, data and program modules may be located in both local and remote computer system storage media including memory storage devices.

Figure 3:
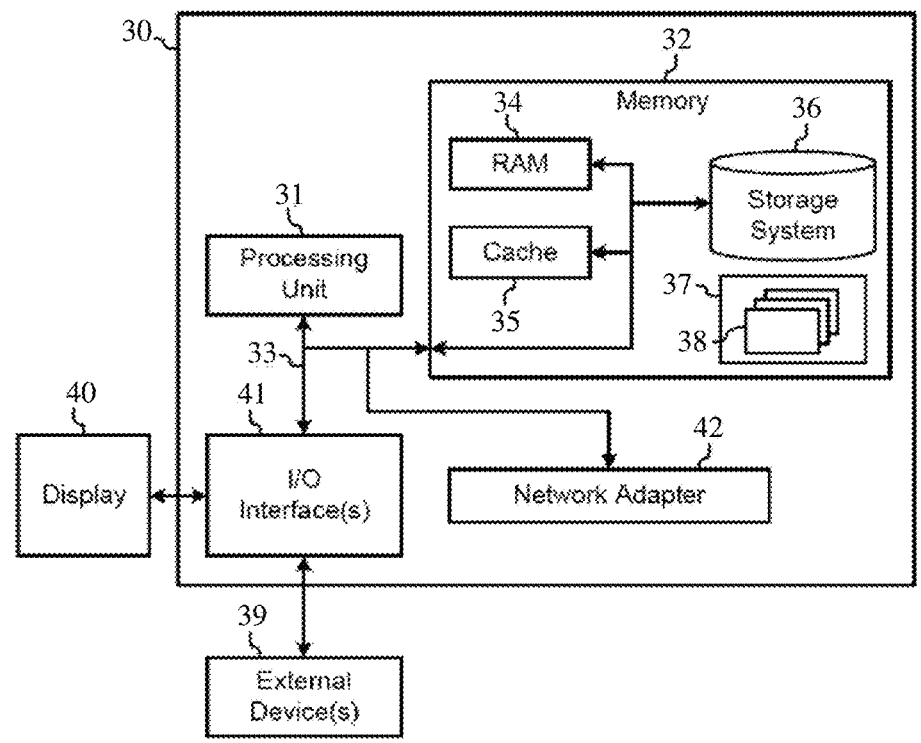
FIG. 3 is a generalized schematic of a computer in the FIG. 2 system.

FIG. 3 is a block diagram of exemplary computing apparatus for implementing a computer of the above system. The computing apparatus is shown in the form of a general-purpose computer 30. The components of computer 30 may include processing apparatus such as one or more processors represented by processing unit 31, a system memory 32, and a bus 33 that couples various system components including system memory 32 to processing unit 31.

Bus 33 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 30 typically includes a variety of computer readable media. Such media may be any available media that is accessible by computer 30 including volatile and non-volatile media, and removable and non-removable media. For example, system memory 32 can include computer readable media in the form of volatile memory, such as random access memory (RAM) 34 and/or cache memory 35. Computer 30 may further include other removable/non-removable, volatile/non-volatile computer system storage media. By way of example only, storage system 36 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 33 by one or more data media interfaces.

Memory 32 may include at least one program product having one or more program modules that are configured to carry out functions of embodiments of the invention. By way of example, program/utility 37, having a set (at least one) of program modules 38, may be stored in memory 32, as well as an operating system, one or more application programs, other program modules, and program data. Each of the operating system, one or more application programs, other program modules, and program data, or some combination thereof, may include an implementation of a networking environment. Program modules 38 generally carry out the functions and/or methodologies of embodiments of the invention as described herein.

Computer 30 may also communicate with: one or more external devices 39 such as a keyboard, a pointing device, a display 40, etc.; one or more devices that enable a user to interact with computer 30; and/or any devices (e.g., network card, modem, etc.) that enable computer 30 to communicate with one or more other computing devices. Such communication can occur via Input/Output (I/O) interfaces 41. Also, computer 30 can communicate with one or more networks such as a local area network (LAN), a general wide area network (WAN), and/or a public network (e.g., the Internet) via network adapter 42. As depicted, network adapter 42 communicates with the other components of computer 30 via bus 33. It should be understood that although not shown, other hardware and/or software components could be used in conjunction with computer 30. Examples include, but are not limited to: microcode, device drivers, redundant processing units, external disk drive arrays, RAID systems, tape drives, and data archival storage systems, etc.

Figure 4:
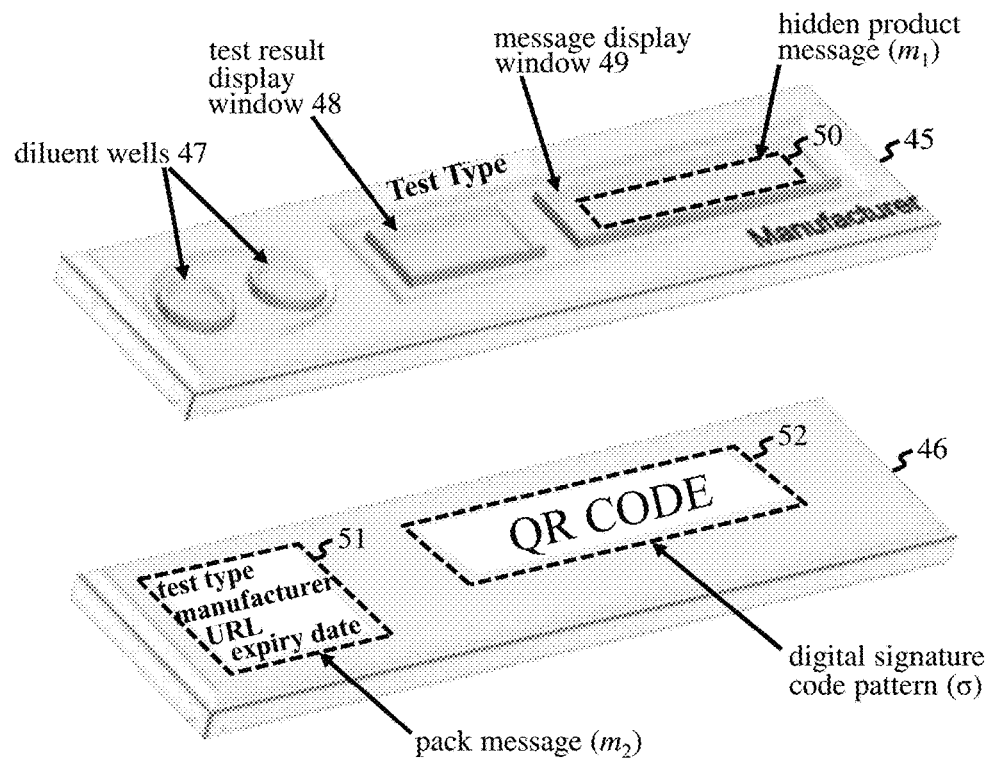
FIG. 4 is a schematic representation of a medical test device embodying the invention.

Operation of authentication system 10 will be described below in relation to preferred embodiments in which the product 23 is a medical test device and the digital signature σ is generated via a fuzzy-message digital signature scheme (FM-DSIG). An FM-DSIG scheme has a verification algorithm for verifying the digital signature σ in relation to fuzzy data, denoted by m', within a predetermined difference measure of the message data m as explained further below. FIG. 4 shows an exemplary embodiment of a medical test device 45 and packaging 46 thereof. Test device 45 is a diagnostic test of a type, in common use in the health-care industry, which is operable by application of a fluid (e.g. blood or urine) to the test device. Such diagnostic tests are commonly used to test for a wide variety of medical conditions. In the example shown, the test device 45 has diluent wells 47 to which the test fluid is applied in use. The diluent wells contain one or more chemicals which dissolve in the test fluid and are conveyed by the fluid (e.g. via an absorbent material or microchannels embedded in the test device) towards a display window 48 of the device. One or more further chemicals may be contained within display window 48 to provide a chemical reaction if the test result is positive, resulting in a visual indication of the test result in the display window. The test device 45 also includes a message display window 49 for displaying a product message 50 comprising message data $m_1$. In this embodiment, the product message 50 is provided on the test in a form which is (at least partially) hidden until the test is used. In particular, the test fluid is conveyed to message display window 49 and reacts with one or more chemicals in the test window to reveal (or fully reveal) the product message 50. Examples of mechanisms for implementing product message 50 are described further below. Test device 45 may also carry additional printed information, e.g. indicating test type and manufacturer details, as illustrated.

The packaging 46 carries the pack message 51, comprising message data $m_2$, and signature message 52 comprising the digital signature σ. In this example, the message data $m_2$ is represented in the form of text in pack message 51, giving validity information such as test type, manufacturer, expiry date, etc., and also a URL (uniform resource locator) for signature management server 12. The digital signature σ is represented in the form of a QR code providing signature message 52 in this embodiment.

Figure 5:
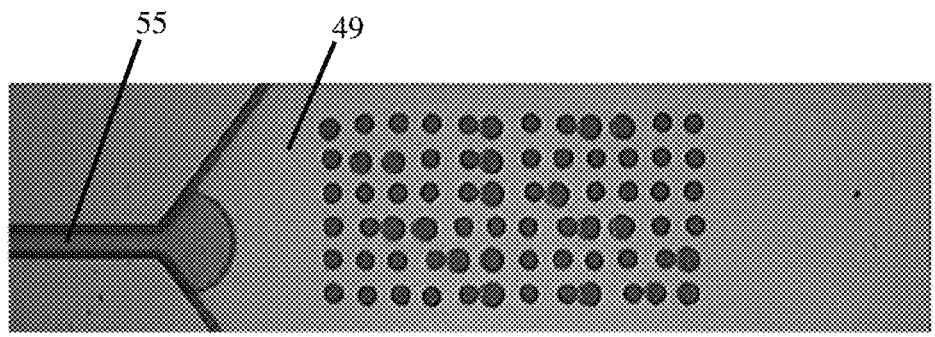
FIGS. 5 and 6 illustrate mechanisms for representing message data on medical test devices embodying the invention.
Figure 6:
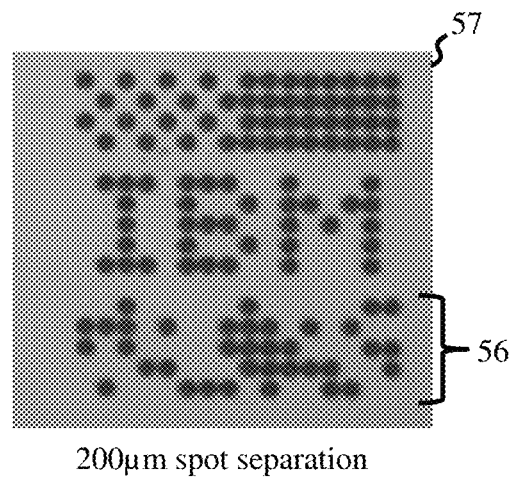

FIG. 5 illustrates an exemplary mechanism for representing the message data $m_1$ in product message 50 of test device 45. This shows a microchannel 55 opening into message display window 49 in which a pattern of chemical dots is printed. The chemicals react with the test fluid to reveal a dot pattern representing message $m_1$. The pattern corresponding to message $m_1$ may be revealed in various ways, e.g. via one or a combination of dots becoming visible or invisible, or changing shape, size, color, etc. FIG. 6 shows another example in which the message $m_1$ is encoded as a dot pattern 56 on a nitrocellulose membrane 57. Again, the dot pattern may be revealed in various ways via reaction with the test fluid and may use color coding and/or dots appearing/disappearing, etc.

In operation of authentication system 10 for test device 45, verifier computer 11 is operated by a user who may be the patient or other party, such as a health care professional, overseeing use of the test. In this application scenario, the verifier computer 11 is conveniently implemented by a mobile phone running an application which provides the functionality of verifier logic 19. The reader device 22 conveniently comprises a camera integrated with the phone. After using the test, the user uses reader device 21 to read the product message 50, the pack message 51 and the signature QR code 52, here by capturing images of the messages using the camera. Verifier logic 19 includes appropriate functionality for interpreting the various images to extract the message data and digital signature presented in the messages. The verifier computer 11 thus reads, via reader device 22, the digital signature σ on the packaging 46, and the message data m, comprising message $m_1$ on the product 45 and message $m_2$ on packaging 46. The verification logic 19 then uses the verification key pk stored in memory 20 to verify the digital signature σ in relation to the read message data obtained using the reader device 21. This verification procedure is performed using a verification algorithm of the FM-DSIG scheme which provides for verification of the signature σ in relation to fuzzy data m' within a predetermined difference measure of the message data m. In particular, inaccuracies inherent in mechanisms described above for representing the product message 50 may result in some degree of error in reading of the first message $m_1$. The resulting read message data, denoted by $m_1'$, corresponding to $m_1$ is treated as fuzzy data in which a limited degree of error is permitted in the verification process. The second message $m_2$ is treated here as a rigid message for which no error (fuzziness) is permitted. The verification procedure will be described below for two implementations of the FM-DSIG scheme.

Figure 7:
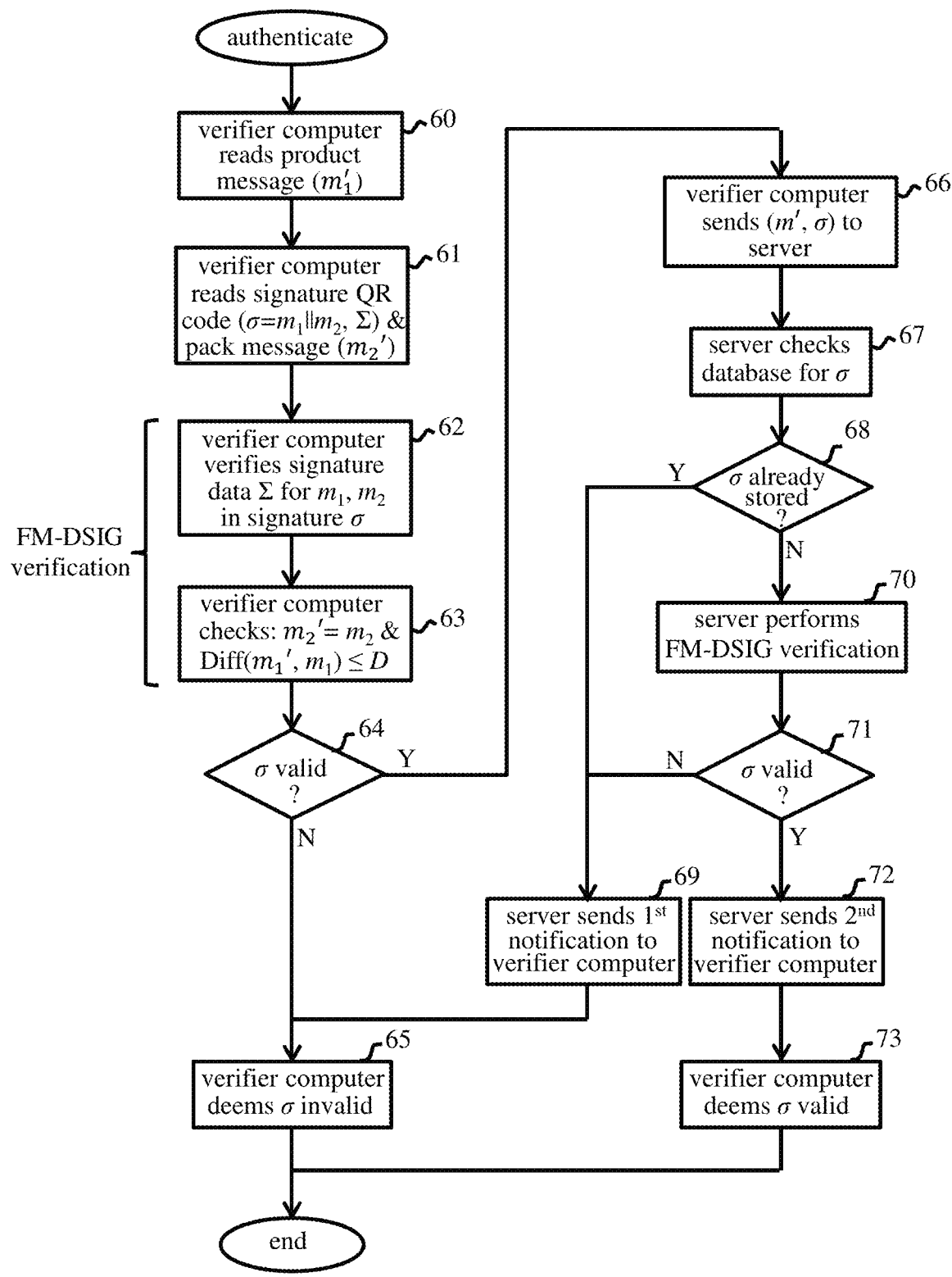
FIG. 7 indicates steps performed in the FIG. 2 system in operation of a first authentication method embodying the invention.

In the first FM-DSIG scheme, the digital signature σ generated in step 2 of FIG. 1 comprises the first message $m_1$, the second message $m_2$, and signature data Σ. In particular, the signature σ=($m_1$||$m_2$,Σ) where || denotes concatenation. The signature data Σ is generated in this step by signing signature-input data, comprising the first message $m_1$ and the second message $m_2$, using the signing key sk. (The signature-input data here may in general comprise $m_1$ and $m_2$ per se or some function thereof as illustrated further below). Steps of the verification procedure in system 10 for the first FM-DSIG scheme are indicated in FIG. 7.

In step 60, verifier computer 11 reads the product message 50 to obtain the read message $m_1'$ corresponding to the first message $m_1$ as described above. In step 61, verifier computer reads the signature QR code 52 to obtain the signature σ=($m_1$||$m_2$,Σ), and reads the pack message 51 to obtain read message data, denoted by $m_2'$, corresponding to the second message $m_2$. In step 62, verifier logic 19 verifies the signature data Σ in relation to the first message $m_1$ and second message $m_2$ as provided in $m_1$||$m_2$ of the signature σ. This verification can be performed, using the verification key pk, via a verification algorithm of a standard signature scheme as detailed below. In step 63, verifier logic 19 determines if the read message data m'=$m_2'$ is within a predetermined difference measure, denoted here by D, of the message data=$m_1$, $m_2$ provided in the signature σ. As in this example only $m_1'$ is permitted to be fuzzy, step 63 is performed by checking that $m_2'$=$m_2$, and that a difference (denoted here by Diff($m_1'$, $m_1$)) between $m_1'$ and $m_1$ is no greater than the difference measure D. The difference function Diff and difference measure D may be defined here in various ways discussed below. Steps 62 and 63 constitute the verification algorithm of the FM-DSIG scheme here. In decision step 64, verifier logic 19 decides whether the FM-DSIG verification is successful for the signature σ. Only if the signature data Σ is verified in step 62, and the read message data m' is within the predetermined difference measure D of m in step 63, is the signature determined to be valid (decision "yes" (Y) at decision block 64). If either step 62 or step 63 fails (decision "no" (N) at decision block 64), then verifier logic 19 deems the signature invalid at step 65. An appropriate message can be displayed to the user via user OF 21, and the verification operation terminates.

If the FM-DSIG verification succeeds at step 64, operation proceeds to step 66 in which verifier logic 19 sends the read message data m' and signature σ to the signature management server 12 over network 13 via communications interface 18. Verifier logic may use the manufacturer URL provided in pack message $m_2$ to access server 12, or the server address may be pre-stored in memory 20 in some embodiments. The signature management logic 15 of server 12 receives the read message data m' and signature σ via communications interface 14. In response, the signature management logic first checks in step 67 whether the received signature has been previously received and stored in signature set {σ} in database 17. If so (Y at decision block 68), logic 15 sends a first notification, indicating that the signature is invalid, back to verifier computer 11 in step 69. In response to receipt of the first notification, verifier logic 19 deems the signature invalid at step 65 and operation terminates as before. If the signature is not already stored in database 17 (N at decision block 68), operation proceeds to step 70 in which logic 15 performs the FM-DSIG verification process for the received (m', σ), repeating the process performed in steps 62 and 63 by verifier logic 19. If the signature is found to be invalid, (N at decision block 71), then operation reverts to step 69, in which the first notification is sent to verifier computer 11, and continues as before. If the signature is found valid (Y at decision block 71), logic 15 sends a second notification, indicating that the signature is valid, back to verifier computer 11 in step 72. In response to receipt of the second notification, verifier logic 19 deems the signature to be valid at step 73. Verifier computer 11 can then display an appropriate message to the user via user I/F 21, and the verification process is complete.

The above process provides secure authentication of medical test device 45, while the FM-DSIG verification process accommodates a limited degree of error in the read product message $m_1'$ such as may arise due to the small space available for the product message and/or inaccuracies inherent the message presentation mechanism. Since test device 45 is uniquely and authentically bound to its packaging 46, a fraudster cannot place a genuine test device in different packaging, e.g. of another type of test. The pack message $m_2$ can be read by a user to check validity information, and since this message is a rigid message for the purposes of verification, the read message $m_2'$ must be correct for signature verification. Hence, a fraudster cannot modify the pack message, e.g. to change expiry dates, without this being detected, or place an expired test in packaging with a valid expiration date. Product details, such as expiration dates, manufacturer, test type, etc., can be verified with strong guarantees, and users can rely on test results. A forger cannot create a new packaged product, or new packaging for a genuine product, having a valid signature, since this requires knowledge of the secret key sk. Moreover, a valid signature can only be registered at signature management server once, preventing replication of messages and valid signatures from genuine products on counterfeits. The additional FM-DSIG verification check (step 70) at server 12, coupled with the fact that the product message is hidden on genuine test devices until use, inhibits abusive reporting of signatures from genuine products to server 12 in an attempt to undermine the system.

Figure 8:
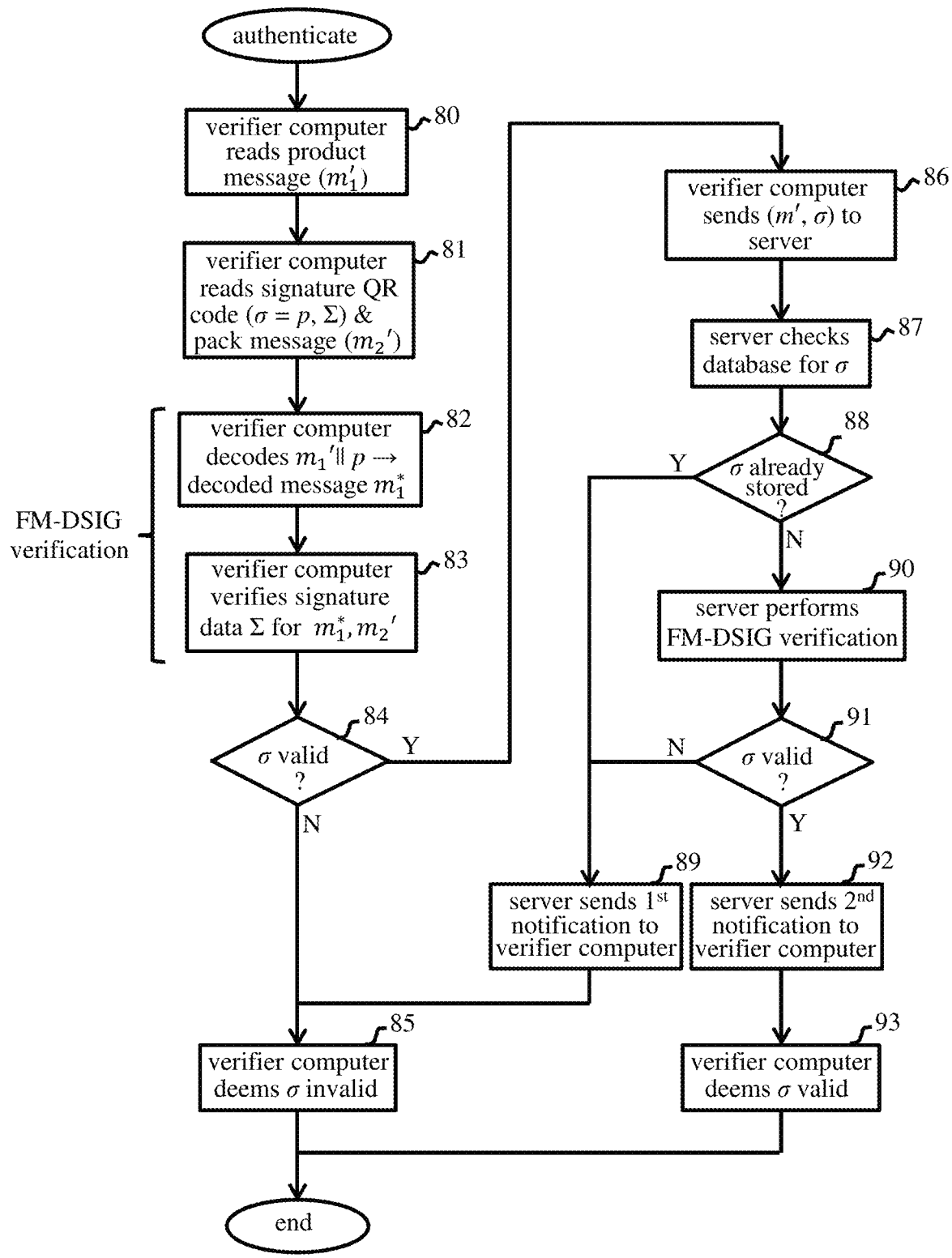
FIG. 8 indicates steps performed in the FIG. 2 system in operation of a second authentication method embodying the invention.

Operation of system 10 for a second FM-DSIG scheme is indicated in FIG. 8. With this scheme, the digital signature σ generated in step 2 of FIG. 1 includes signature data Σ generated by encoding the first message $m_1$ to produce an encoded message e($m_1$) which comprises the first message $m_1$ and parity data p, and signing signature-input data, comprising the first message $m_1$ and the second message $m_2$, using the signing key sk. (The signature-input data here may in general comprise $m_1$ and $m_2$ per se, or may comprise the encoded message e($m_1$) and $m_2$, or may comprise some function of these elements as illustrated below). The digital signature σ includes the parity data p in this scheme, i.e. α=(p,Σ). Steps 80 and 81 of FIG. 8 correspond to steps 60 and 61 of FIG. 7 in which verifier computer 11 reads the product message 50 to obtain the read message data $m_1'$, the signature QR code 52 to obtain the signature σ=(p,Σ), and the pack message 51 to obtain the read message data $m_2'$. In step 82, verifier logic 19 then decodes the read message data $m_1'$ using the parity data p in the signature to obtain a decoded message, denoted by $m_1^*$. That is, the verifier logic decodes $m_1'$||p to obtain the decoded message $m_1^*$. In step 83, verifier logic 19 then verifies the signature data Σ in relation to the decoded message $m_1^*$ and the read second message $m_2'$. This verification can be performed, using the verification key pk, via a verification algorithm of a standard signature scheme as described below. Note that decoding step 82 will give a decoded message $m_1^*$ equal to the first message $m_1$ if the read message data is within a predetermined difference measure of the first message $m_1$. This difference measure is determined by the error-correcting limit of the encoding scheme used to encode the first message $m_1$ and generate the parity data p. If this difference measure is exceeded ($m_1'$ is too different from $m_1$ and therefore contains too many errors) the decoded message $m_1^*$ will not equal $m_1$ and signature verification step 83 will fail. As before, successful signature verification requires that $m_2'=m_2$.

Steps 82 and 83 thus constitute the verification algorithm of the second FM-DSIG scheme. Subsequent steps 84 through 93 correspond respectively to steps 64 through 73 of FIG. 7. This second scheme provides all advantages of the first scheme above, with the additional advantage that message data is hidden in the digital signature σ, i.e. the signature σ does not reveal the message data per se but only the parity data p.

The procedures of FIGS. 7 and 8 can be readily adapted for scenarios in which use of a second, rigid message $m_2$ is not required simply by omitting features specific to $m_2$ from the operations described.

Exemplary constructions for the FM-DSIG schemes of FIGS. 7 and 8 are described in detail below. Some preliminaries are described first.

Basic Functions

Definition 1 (Bilinear Maps)

Let $\mathbb{G}_1$, $\mathbb{G}_2$, and $\mathbb{G}_T$ be groups of prime order q. A map e: $\mathbb{G}_1 \times \mathbb{G}_2 \to \mathbb{G}_T$ is called a bilinear map if it satisfies:

bilinearity: $\forall u_1 \in \mathbb{G}_1, \forall u_2 \in \mathbb{G}_2, \forall x, y \in \mathbb{Z}, e(u_1^x, u_2^y) = e(u_1, u_2)^{xy}$;

non-degeneracy: for all generators $g_1 \in \mathbb{G}_1$ and $g_2 \in \mathbb{G}_2$, $e(g_1, g_2)$ generates $\mathbb{G}_T$; and efficiency: there exists an efficient algorithm $\mathcal{G}(1^\lambda)$ that outputs the bilinear group (q, $\mathbb{G}_1$, $\mathbb{G}_2$, $\mathbb{G}_T$, e, $g_1$, $g_2$) and an efficient algorithm to compute $e(u_1, u_2)$ for any $u_1 \in \mathbb{G}_1$, $u_2 \in \mathbb{G}_2$. If $\mathbb{G}_1 = \mathbb{G}_2$ the map is symmetric and otherwise it is asymmetric.

Definition 2 (Binary Hamming Distance).

The binary Hamming distance $d_2(M, N)$ between two binary matrices of same dimensions M, N is the number of bits where those matrices differ.

Block Codes

Definition 3 (Binary Block Codes).

A binary block code is an injective mapping $C: 2^k \to 2^n$ where k is the message length and n is the block length. A message is any element in $2^k$, while the code C is the set of all images.

In the above definition it is worth noting that although codewords are strings of length n, not all elements in $2^n$ are codewords. A string of n bits is only considered a codeword if it is the image of a k-bit string.

Binary block codes are denoted by $[n, k, d_{min}]_2$, where $d_{min}$ is the minimum distance of the code, as described in Definition 5. A binary code can also be denoted by a simplified notation where the minimum distance is omitted, i.e., $[n, k]_2$. The number n k is the redundancy of the code.

Definition 4 (Rate of a Code).

The rate of a block code is defined as the ratio between its message length and its block length, that is R=k/n.

Definition 5 (Minimum Distance).

The minimum distance $d_{min}$ of a block code is the minimum number of positions in which any two distinct codewords differ.

Theorem 1 (Error Detection Capabilities).

A binary code C can detect up to k errors in any codeword if and only if $d_{min} \geq k+1$.

Theorem 2 (Error Correction Capabilities).

A binary code C can correct up to k errors in any codeword if and only if $d_{min} \geq 2k+1$.

Definition 6 (Binary Error-Correcting Codes). A binary error-correcting code (binary ECC) is a $[n, k, d_{min}]_2$ code that has both an encoding function e: $\{0,1\}^k \to \{0,1\}^n$, and a decoding function d $\{0,1\}^n \to \{0,1\}^k$. The encoding function maps messages to codewords, while the decoding function takes any string in the range $\{0,1\}^n$ and maps it back to a message.

Note that decoding functions in binary ECC codes can map different elements of $2^n$ into the same message, and thus are not injective mappings.

Definition 7 (Linear Block Codes).

A binary linear block code $[n, k]_2$ is a k-dimensional subspace of the n-dimensional vector space.

Definition 8 (Generator Matrix).

A generator matrix G of a binary linear block code $[n, k]_2$ is a k×n matrix whose rows form a basis for the k-dimensional subspace of the n-dimensional vector space. G can be rearranged in a standard form $G=[I_k|P]$, where $I_k$ denotes the k×k identity matrix, and P is some k×(n−k) matrix, called the parity matrix.

The above definition implies that the codewords of a code C are obtained via v=xG, and therefore have the form $x_1, \ldots, x_k, p_1, \ldots p_{n-k}, \ldots$ where $x=x_1, \ldots, x_k$ is the original message, and $p_1, \ldots p_{n-k}$ are parity bits.

Definition 9 (Parity Check Matrix).

Given a linear code C with generator matrix G, an (n−k)×n matrix H is called a parity check matrix for C if and only if for every codeword $v \in C$, $Hv^T=0$ (with $v^T$ being the transpose of vector v). This means that to every $G=(I_k|P)$, a parity check matrix $H=(-P^T|I_{n-k})$ can be associated.

Syndrome Decoding.

Let $C=[n, k, d_{min}]$ be a linear code with generator G and parity check matrix H. From Theorem 2, C can correct up to $t=\lfloor (d_{min}-1)/2 \rfloor$ errors. Assume that to an encoded message v=xG, up to t errors are added. The message then becomes u=xG+e, where e is a binary string that has 1 in each position where the errors occurred. When we calculate $Hu^T$, we obtain:

$$Hu^T = H(v^T + e^T) = 0 + He^T = He^T$$

To decode, a syndrome dictionary needs to be stored. This dictionary contains all possible t-error vectors along with their syndromes $He^T=s$. When decoding, first calculate the syndrome $s=He^T$, look up s in the dictionary to find e, and compute v=u+e.

Hamming Codes.

A Hamming code is a code in which a parity check matrix H, with dimensions (n−k)×n, is formed by all possible non-zero binary vectors (n−k)×1 in any order, so that the last n-k columns form the identity matrix $I_{n-k}$. For example, the Hamming Code $C=[7, 4, 3]_2$ has parity check matrix $$H = \begin{bmatrix} 0111100 \\ 1011010 \\ 1101001 \end{bmatrix}$$

Messages are vectors $x=x_1, x_2, x_3, x_4$, and codewords are vectors $v=x_1, x_2, x_3, x_4, p_1, p_2, p_3$. Since $d_{min}=3$, the code C can correct up to $t=\lfloor(3-1)/2\rfloor=1$ error.

Digital Signatures

Definition 10 (Digital Signatures).

A digital signature scheme is a triple of polynomial-time algorithms DSIG=(gen, sig, ver) together with a message space $\mathcal{M}$ where:

gen($\lambda$): takes as input a security parameter and outputs a key pair (pk,sk).

sig(sk,m): takes as input a signing key sk and a message $m \in \mathcal{M}$, and outputs a signature $\sigma$.

ver(pk,m',$\sigma$): takes as input a verification key pk, a message m' and a purported signature $\sigma$, and outputs valid or invalid.

Correctness.

A digital signature scheme is said to be correct if for all $$(pk, sk) \xleftarrow{r} gen(\lambda),$$

and all messages $m \in \mathcal{M}$, it holds that valid←ver(pk,m,sig(sk,m)).

The standard security notion for signature schemes is called existential unforgeability under an adaptive chosen message attack. For our purposes, we need a slightly different notion. A security notion satisfying our requirements is called existential unforgeability under a weak chosen message attack (eu-w-cma) as discussed further below.

The Boneh Boyen Short Signature Scheme.

Let $\mathbb{G}_1$, $\mathbb{G}_2$ and $\mathbb{G}_T$ be groups of prime order q with $\log_q > \lambda$ that allow for a bilinear map: $\mathbb{G}_1 \times \mathbb{G}_2 \to \mathbb{G}_T$. The components of Boneh Boyen's short signature scheme (described in "Short signatures without random oracles and the SDH assumption in bilinear groups", Boneh & Boyen, J. Cryptology, 21(2):149-177, 2008) are as follows:

gen($\lambda$): select random generators $g_1 \in \mathbb{G}_1$ and $g_2 \in \mathbb{G}_2$, and a random integer $x \to Z_q^*$. Compute $v \leftarrow g_2^x$ and $c \leftarrow e(g_1, g_2) \in \mathbb{G}_T$. Output pk=($g_1, g_2$, V, c) and sk=($g_1$, x).

sig(sk,m): on input $m \in Z_q$, parse sk as ($g_1$,x) and output $\sigma = g_1^{1/(x+m)} \in \mathbb{G}_1$. In the unlikely event that x+m=0 (mod p), sig(sk,m) outputs $\sigma = 1 \in \mathbb{G}_1$.

ver(pk,m',$\sigma$): parse pk as ($g_1, g_2$,v,c). If $e(\sigma, v \cdot g_2^m) = c$ or if $\sigma = 1$ and $v \cdot g_2^m = 1$, output valid. Otherwise output invalid.

Observe that c is pre-computed and included in the public key to add efficiency to the verification algorithm. In this case, $g_1$ can be omitted from the public key. We will consider the case where $\mathbb{G}_1 \neq \mathbb{G}_2$ since the elements of $\mathbb{G}_1$ may have a shorter representation than those of $\mathbb{G}_2$, and thus we can obtain the shortest possible signatures.

Theorem 3 (Security of Boneh Boyen's Short Signature Scheme).

The above construction is existentially unforgeable against weak chosen message attacks under the q-SDH assumption.

Fuzzy-Message Digital Signatures (FM-DSIG)

We define the notion of fuzzy-message digital signature (FM-DSIG) schemes, where a signature can verify a message as authentic even if part of the message has been slightly corrupted, i.e., it allows part of the message to be fuzzy. In order to restrain adversaries from producing valid forgeries however, only a certain degree of corruption is allowed.

Definition 11 (Fuzzy-Message Digital Signatures)

A fuzzy-message digital signature scheme is a tuple of polynomial-time algorithms FM-DSIG=(fgen, fsig, fver, fclo) together with a message space $\mathcal{M} = \mathcal{M}_1 \times \mathcal{M}_2$, where $\mathcal{M}_1$ is the space of fuzzy messages and $\mathcal{M}_2$ is the space of rigid messages, i.e., messages that cannot be altered. The tuple of algorithms work as follows.

fgen($\lambda$): takes as input a security parameter and outputs a key pair (pk,sk).

fsig(sk,m): takes as input a signing key sk and a message $m=m_1 \| m_2 \in \mathcal{M}_1 \times \mathcal{M}_2$, and outputs a signature $\sigma$.

fver(pk,m',$\sigma$): takes as input a verification key pk, a message $m'=m_1' \| m_2'$ and a purported signature $\sigma$, and outputs valid or invalid.

fclo(m,m'): takes as input two messages $m=m_1 \| m_2 \in \mathcal{M}_1 \times \mathcal{M}_2$ and $m'=m_1' \| m_2' \in \mathcal{M}_1 \times \mathcal{M}_2$ and outputs 1 if $m_1$ and $m_1'$ are close to each other and $m_2=m_2'$.

Correctness.

A fuzzy-message digital signature scheme is said to be correct if for all $$(sk, pk) \xleftarrow{r} fgen(\lambda),$$

and all messages=$m_1 \| m_2$, $m'=m_1' \| m_2' \in (\mathcal{M}_1 \times \mathcal{M}_2)^2$ with fclo(m,m')=1, it holds that valid←fver(pk,m',fsig(sk,m)).

Fuzzy Existential Unforgeability Under Weak Chosen Message Attacks (Feu-w-Cma).

This notion is an adaptation of the eu-w-cma notion for signature schemes mentioned above to the fuzzy-message signature scenario. Let f(m) be the set of all messages m* with fclo(m, m*)=1 and let (f(m),$\sigma$) represent all pairs consisting of one element of f(m) and the signature $\sigma$. A fuzzy-message digital signature scheme with message space $\mathcal{M} = \mathcal{M}_1 \times \mathcal{M}_2$ is said to be existentially unforgeable against weakly chosen message attacks if no adversary $\mathcal{A}$ can win the following experiment with non-negligible probability in the security parameter $\lambda$.

Query.

Receive from $\mathcal{A}$ a list of messages $m^1, \ldots, m^q$, where each message $m^i$, i=1, ..., q, can be written as $m_1^i \| m_2^i \in \mathcal{M}_1 \times \mathcal{M}_2$, and add them to a list Q.

Response.

Run $$(pk, sk) \xleftarrow{r} fgen(\lambda),$$

and generate $\sigma^i \leftarrow fsig(sk,m^i)$ for i=1, ..., q. Hand pk and the q signatures $\sigma^1, \ldots, \sigma^q$ to $\mathcal{A}$.

Output.

Eventually $\mathcal{A}$ outputs (m*,$\sigma$*) with $m^* := m_1^* \| m_2^*$, and wins the experiment if all of the following conditions hold.
1. $m^* \in \mathcal{M}_1 \times \mathcal{M}_2$,
2. (m*, $\sigma$*) is not any of (f($m^1$),$\sigma^1$) ... (f($m^q$), $\sigma^q$), and
3. fver(pk,m*,$\sigma$*)=valid.

First FM-DSIG Construction

Let DSIG=(gen, sig, ver) be an ordinary (i.e., non-fuzzy) digital signature scheme where messages are distributed over a message space $\mathcal{M}_2$. Let $f: \mathcal{M}_1 \times \mathcal{M}^1 \to \{0, 1\}$ be a similarity function, and let H: $\mathcal{M}_1 \to \mathcal{M}_2$ be an invertible mapping that maps elements of $\mathcal{M}_1$ into elements of $\mathcal{M}_2$. We construct a basic fuzzy-message digital signature FM-DSIG$_{basic}$=(fgen, fsig, fver, fclo), over message space $\mathcal{M} = \mathcal{M}_1 \times \mathcal{M}_2$, as follows.

fgen($\lambda$): identical to gen($\lambda$).

fsig(sk,m): on input m=$m_1$∥$m_2 \in \mathcal{M}_1 \times \mathcal{M}_2$, output $\sigma \leftarrow$(m, sig(sk,H($m_1$)+$m_2$)). The signature-input data described above is thus H($m_1$)+$m_2$ here.

fver(pk,m',$\sigma$): parse the signature $\sigma$ as $\sigma \leftarrow$(m,$\Sigma$), with m=$m_1$∣$m_2 \in \mathcal{M}_1 \times \mathcal{M}_2$. Output valid if ver(pk,H($m_1$)+$m_2$, $\Sigma$)=valid and fclo(m,m')=1. Otherwise output invalid.

fclo(m,m'): on input two messages m=$m_1$∥$m_2 \in \mathcal{M}_1 \times \mathcal{M}_2$ and m'=$m_1$'×$m_2$'$\in \mathcal{M}_1 \times \mathcal{M}_2$, the closeness function outputs 1 if $f(m_1, m_1')$=1 and $m_2$=$m_2$'.

Instantiation.

We use the Boneh Boyen short signature scheme described above as the ordinary digital signature scheme, and the binary Hamming distance, described in Definition 2, to build the similarity function $f$. Let $\mathbb{G}_1$, $\mathbb{G}_2$ and $\mathbb{G}_T$ be groups of prime order q with $\log_q > \lambda$ that allow for a bilinear map $\mathbb{G}_1 \times \mathbb{G}_2 \to \mathbb{G}_T$. Also, let $f: \{0,1\}^k \times \{0,1\}^k \to \{0, 1\}$ be a function that takes two bit-strings of length k and outputs 1 if the Hamming distance between those strings is not greater than a bound r. Note that by definition r cannot be greater than the length of the messages. The components of our FM-DSIG$_{basic}$ scheme over message space $\{0,1\}^k \times \mathbb{Z}_q$ work as follows.

fgen($\lambda$): select random generators $g_1 \in \mathbb{G}_1$ and $g_2 \in \mathbb{G}_2$, and a random integer x←$\mathbb{Z}_q$*. Compute v←$g_2^x$ and c←e($g_1$,$g_2$)$\in \mathbb{G}_T$. Output pk=($g_1$,$g_2$,v,c) and sk=($g_1$,x).

fsig(sk,m): on input m=$m_1$∥$m_2 \in \{0,1\}^k \times \mathbb{Z}_q$, parse sk as ($g_1$,x) and output $\sigma \leftarrow$(m, $g_1^{1/(x+H(m_1)+m_2)}$). In the unlikely event that x+H($m_1$)+$m_2$=0 (mod q), fsig(sk,m) outputs $\sigma$=(m,1).

fver(pk,m',$\sigma$): parse pk as ($g_1$,$g_2$,v,c) and $\sigma$ as $\sigma \leftarrow$($m_1$∥$m_2$, $\Sigma$). Check if one of the following conditions hold:
1. e($\Sigma$,v·$g_2^{H(m_1)+m_2}$)=C or
2. $\Sigma$=1 and v·$g_2^{H(m_1)+m_2}$=1.

If so and if fclo(m, m')=1, output valid. Otherwise output invalid.

fclo(m, m'): on input two messages m=$m_1$∥$m_2 \in \{0,1\}^k \times \mathbb{Z}_q$ and m'=$m_1$'∥$m_2$'$\in \{0,1\}^k \times \mathbb{Z}_q$ output 1 if and only if $f(m_1, m_1')$=1 and $m_2$=$m_2$'.

Although in the above instantiation we are assuming that messages m=$m_1$∥$m_2$ are elements in $\{0,1\}^k \times \mathbb{Z}_q$, we could instead sign any message m$\in \{0,1\}^* \in \{0,1\}^*$ by appropriately applying collision-resistant hash functions to the messages.

Second FM-DSIG Construction Based on Error-Correcting Codes

Let DSIG=(gen, sig, ver) be an ordinary (non-fuzzy) digital signature scheme where messages are distributed over a message space $\mathcal{M}_2$. Let C be an [n,k,$d_{min}$]$_2$ code with encoding function e: $\{0,1\}^k \to \{0,1\}^n$, and a decoding function d: $\{0,1\}^n \to \{0,1\}^k$, and let H: $\{0,1\}^n \to \mathcal{M}_2$ be an invertible mapping that maps elements of $\{0,1\}^n$ into elements of $\mathcal{M}_2$. We construct a fuzzy-message digital signature FM-DSIG$_{ecc}$=(fgen, fsig, fver, fclo) over message space $\mathcal{M}=\{0,1\}^k \times \mathcal{M}_2$ which hides the fuzzy message, i.e. the fuzzy message is not revealed in the signature, as follows.

fgen($\lambda$): identical to gen($\lambda$).

fsig(sk,m): on input m=$m_1$∥$m_2 \in \{0,1\}^k \times \mathcal{M}_2$, encode $m_1$ as e($m_1$):=$m_1$∥p where p=parity bits. Output $\sigma \leftarrow$(p,sig(sk, H(e($m_1$))+$m_2$)). The signature-input data described above is thus H(e($m_1$))+$m_2$ here.

fver(pk,m',$\sigma$): on input m'=$m_1$∥$m_2$, parse $\sigma$ as $\sigma \leftarrow$(p,$\Sigma$), and decode $m_1$∥p as $m_1^* \leftarrow$d($m_1$'∥p). Output valid if ver(pk,H($m_1^*$∥p)+$m_2$',$\Sigma$)=valid. Otherwise output invalid.

fclo (m,m'): The closeness function on input two messages m=$m_1$∥$m_2 \Sigma \{0,1\}^k \times \mathcal{M}_2$ and m'=$m_1^*$∥$m_2' \in \{0,1\}^k \times \mathcal{M}$, outputs 1 if the number of 1's in $m_1 \gamma m_1$' is at most $\lfloor (d_{min}-1)/2 \rfloor$, the error-correcting capability of the code, and $m_2$=$m_2$'.

Note that in the above construction, if $m_1$=$m_1$' differ in at most $\lfloor (d_{min}-1)/2 \rfloor$, bits then, by the error-correction capability of C, $m_1^* \leftarrow$d($m_1$'∥p) will equal $m_1$. Therefore, as long as $m_2$=$m_2$', the verification algorithm will output valid.

Instantiation.

We use the Boneh Boyen short signature scheme described above as the ordinary digital signature scheme, and let C be a Hamming Code [n,k,$d_{min}$]$_2$ as described above. Let $\mathbb{G}_1$, $\mathbb{G}_2$ and $\mathbb{G}_T$ be groups of prime order q with $\log_q > \lambda$ that allow for a bilinear map: $\mathbb{G}_1 \times \mathbb{G}_2 \to \mathbb{G}_T$. Let G and H be the generator and parity check matrices, respectively, of the error-correcting code C, and let H: $\{0,1\}^n \to \mathbb{Z}_q$ be an invertible function. The algorithms of FM-DSIG$_{ecc}$ which accepts messages in $\{0,1\}^k \times \mathbb{Z}_q$ are as follows.

fgen($\lambda$): select random generators $g_1 \in \mathbb{G}_1$ and $g_2 \in \mathbb{G}_2$, and a random integer x←$\mathbb{Z}_q$*. Compute v←$g_2^x$ and c←e($g_1$,$g_2$)$\in \mathbb{G}_T$. Output pk=($g_1$,$g_2$,v,c) and sk=($g_1$,x).

fsig(sk,m): on input m=$m_1$∥$m_2 \in \{0,1\}^k \times \mathbb{Z}_q$, encode $m_1$ as e($m_1$):=$m_1$·G=$m_1$∣p. Parse sk as ($g_1$,x) and compute $g_1^{1/(x+H(e(m_1))+m_2)} \leftarrow$ sig(sk,H(e($m_1$))+$m_2$). In the unlikely event that x+H(e($m_1$))+$m_2$=0 (mod q), sig(sk, H(e($m_1$))+$m_2$) outputs 1. Output $\sigma \leftarrow$(p,$g_1^{1/(x+H(e(m_1))+m_2)}$).

fver(pk,m',$\sigma$): on input m'=$m_1$'∥$m_2$', parse pk as ($g_1$,$g_2$,v,c) and a as (p,$\Sigma$). Compute the syndrome s←H·($m_1$'∣p)$^T$. Search for (s,e) in a syndrome dictionary, where e is an error bit string associated to the syndrome s. Compute $m_1^*$=($m_1$'∣p)+e. Check if one of the following conditions hold:
1. e($\Sigma$,v·$g_2^{H(e(m_i^*))+m_2'}$)=c or
2. $\Sigma$=1 and v·$g_2^{H(e(m_i^*))+m_2'}$=1.

If so, output valid. Otherwise output invalid.

fclo(m,m'): The closeness function on input two messages m=$m_1$∥$m_2 \in \{0,1\}^k \times \mathbb{Z}_q$ and m'=$m_1$'∥$m_2' \in \{0,1\}^k \times \mathbb{Z}_q$, outputs 1 if the number of 1's in $m_1 \oplus m_1$' is at most $\lfloor (d_{min}-1)/2 \rfloor$, the error-correcting capability of the code, and $m_2$=$m_2$'.

Using the above FM-DSIG constructions in the medical test device application, the product manufacturer can obtain a verification/signing key pair via $$(pk, sk) \xleftarrow{r} fgen(\lambda),$$

and then register the verification key pk with a certificate authority CA. Users who wish to verify the authenticity of products will use a verification computer 11 containing the algorithms fver, fclo of FM-DSIG, and the verification keys of all trusted CAs. The manufacturer generates the digital signature $\sigma$=fsig(sk,$m_1$∥$m_2$). After using the test, the verifier computer can select the verification key pk corresponding to product manufacturer, and run fver(pk,m',$\sigma$) to determine whether $\sigma$ is a valid signature for the read messages $m_1$', $m_2$' in m'. If $\sigma$ is valid, the verifier computer accesses signature management server 12, using the URL contained in $m_2$, to report (m',$\sigma$) as described above. Server 12 also runs fver (pk,m',$\sigma$) to check signature validity as described. Using the second construction above, the FM-DSIG scheme is feu-w-cma secure, protecting against forgeries even on previously signed messages (and also messages close to those).

Many changes and modifications can of course be made to the exemplary embodiments described. For example, the fuzzy message could be visible before the test is used. This would allow clinics, doctors, etc., to verify the authenticity of the product without having to use it. Where verification may be performed for products of multiple different manufacturers, the number of trusted verification keys stored by verification computers could be reduced by having the signature σ signed by a chain of certificate authorities. Verification computers would then only need to store verification keys of root CAs.

The schemes described can be applied to other forms of medical test device, e.g. nitrocellulose based test strips, and to any other products for which authentication may be required. It will be apparent that the embodiments described are especially advantageous where there is limited space for the message to be authenticated and the space limitation means that a message may be inaccurately printed or read and constrains added redundancy for the fuzzy message. Messages may of course be applied to products/packaging in other ways, e.g. using tamper-proof stickers, or may be otherwise printed on or embedded in products/packaging in any convenient manner. Also, scenarios can be envisaged in which verification of signatures by verifier computer 11 is sufficient for authentication, i.e. signature management server 12 is not required. Steps performed by server 12 might be performed by verifier computer 11 in some scenarios.

The difference measure D for the FM-DSIG scheme may be implemented in various other ways as will be apparent to those skilled in the art. For instance, a difference measure based on Euclidean distance may be used in other embodiments. The second FM-DSIG scheme above may of course be based on codes other than binary codes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for producing an authenticated packaged product, the method comprising:
   generating, by a manufacturer computer, a digital signature, dependent on message data for the product, via a fuzzy-message digital signature scheme using a secret signing key;
   printing, by a product manufacturer, the message data as a pattern of chemical dots on the product;
   printing, by the product manufacturer, the digital signature as ink-printed dots on the packaging; and
   packing, by the product manufacturer, the product in the packaging.

2. The method as claimed in claim 1, further comprising: verifying, by a verification logic, that the digital signature is within a predetermined difference measure of said message data, according to a verification algorithm of the fuzzy-message digital signature scheme.

3. The method as claimed in claim 2, further comprising:
   printing, by the product manufacturer, the message data as a first message m1 on the product;
   generating, by the manufacturer computer, signature data $\Sigma$ by signing signature-input data, comprising the first message m1, using the secret signing key; and
   printing, by the product manufacturer, the digital signature as the first message m1 and the signature data $\Sigma$.

4. The method as claimed in claim 2, further comprising:
   printing, by the product manufacturer, the message data as a first message m1 on the product;
   generating, by the manufacturer computer, a second message m2;
   generating, by the manufacturer computer, signature data $\Sigma$ by signing signature-input data, which comprises the first message m1 and the second message m2, using the secret signing key; and
   printing, by the product manufacturer, the digital signature as the first message m1, the second message m2, and the signature data $\Sigma$ on the packaging where the message data is not printed.

5. The method as claimed in claim 4, further comprising generating, by the manufacturer computer, the signature-input data as H(m1)+m2 where H is an invertible function which maps m1 to a signature space for the fuzzy-message digital signature scheme.

6. The method as claimed in claim 2, further comprising:
   generating, by the manufacturer computer, the message data comprising a first message m1;
   printing, by the product manufacturer, the message data on the product;
   generating, by the manufacturer computer, signature data $\Sigma$ by encoding the first message m1 to produce an encoded message e(m1) which comprises the first message m1 and parity data p, and signing signature-input data, which comprises the first message m1, using the secret signing key; and
   printing, by the product manufacturer, the digital signature as the first message m1, the parity data p, and the signature data $\Sigma$ on the packaging where the message data is not printed.

7. The method as claimed in claim 6, wherein generating the signature data $\Sigma$ includes signing the signature-input data comprising the first message m1 and the encoded message e(m1), using the secret signing key.

8. The method as claimed in claim 6, further comprising:
   printing, by the product manufacturer, a second message m2 on the packaging where the digital signature is printed; and
   signing, by the manufacturer computer, the signature-input data that comprises the first message m1 and the second message m2, using the secret signing key.

9. The method as claimed in claim 8, further comprising generating, by the manufacturer computer, the signature-input data as H(e(m1))+m2 where H is an invertible function which maps e(m1) to a signature space for the signature scheme.

10. The method as claimed in claim 1, wherein:
    the product is a medical test device that is operable to alter the appearance of a printed indicator by application of a fluid to the device; and
    the message data is printed on the device as a concealed part of the printed indicator,
    the method further comprising:
    a product user revealing the message data by application of the fluid to the device.

11. The method as claimed in claim 10, further comprising:
    printing, by the product manufacturer, a second message m2 on the packaging as part of the message data; and producing, by the manufacturer computer, the digital signature from signature data Σ generated by encoding the first message m1 to produce an encoded message e(m1) which comprises the first message m1 and parity data p, and signing signature-input data, comprising the first message m1 and the second message m2, using the secret signing key, wherein the digital signature includes the parity data p.

12. The method as claimed in claim 11 wherein the second message m2 is represented on the packaging in the form of text giving validity information relating to the device.

* * * * *